June 24, 1952   O. L. KRINGLE   2,601,618
UNLOADING ASSEMBLY FOR WAGON BOXES
Filed Nov. 5, 1948   3 Sheets-Sheet 1
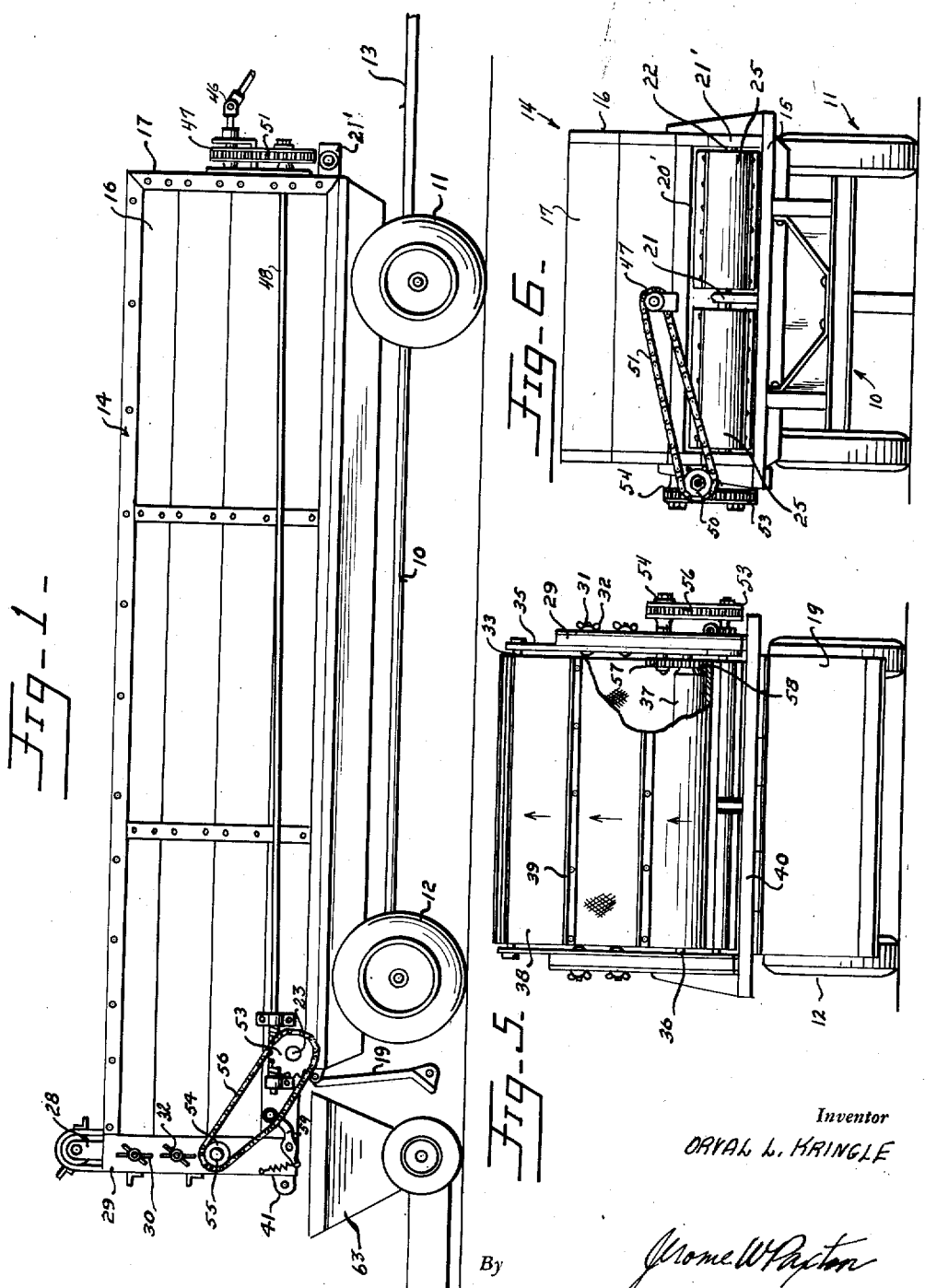
Inventor
ORVAL L. KRINGLE

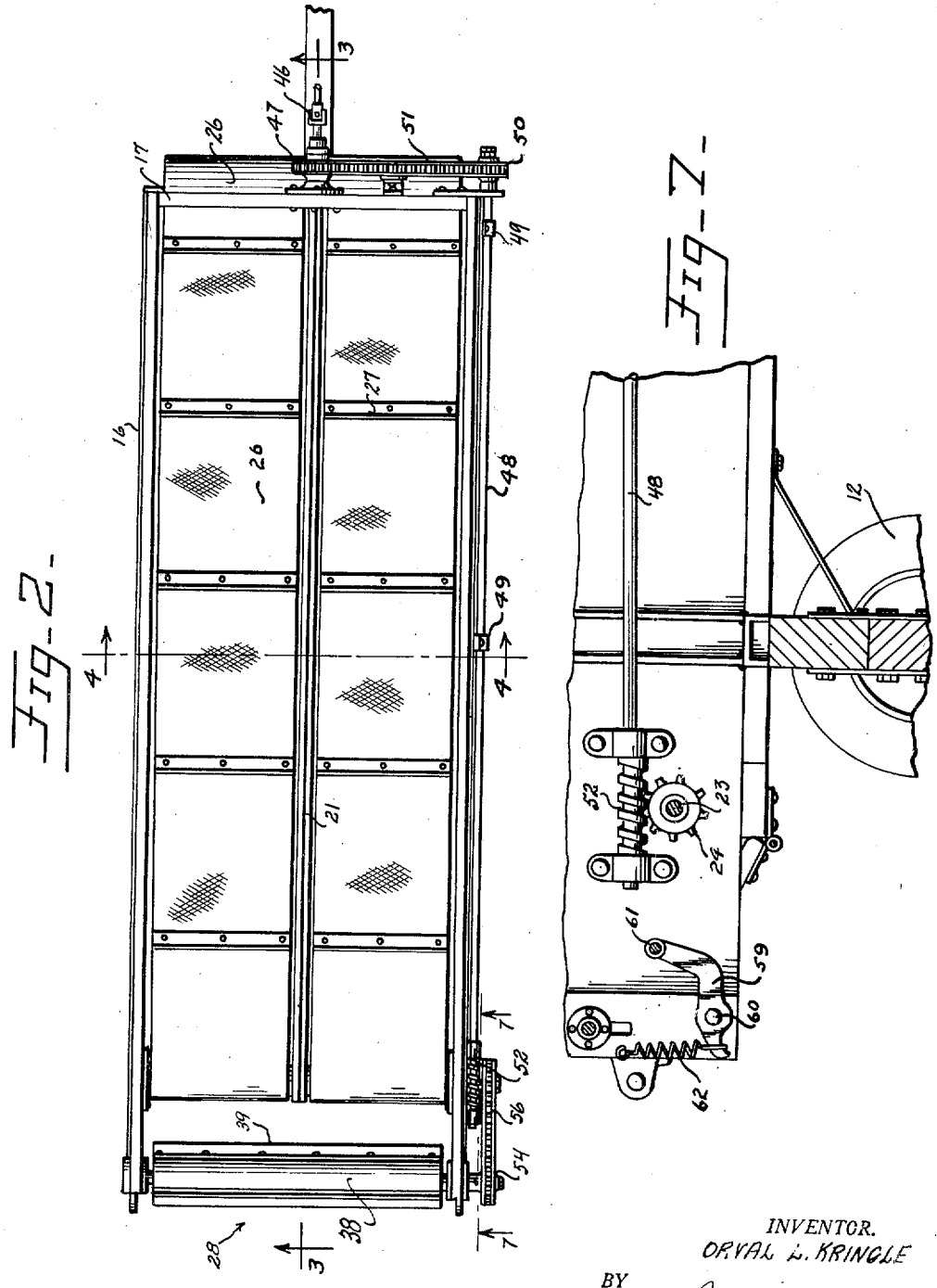

June 24, 1952 — O. L. KRINGLE — 2,601,618
UNLOADING ASSEMBLY FOR WAGON BOXES
Filed Nov. 5, 1948 — 3 Sheets-Sheet 3
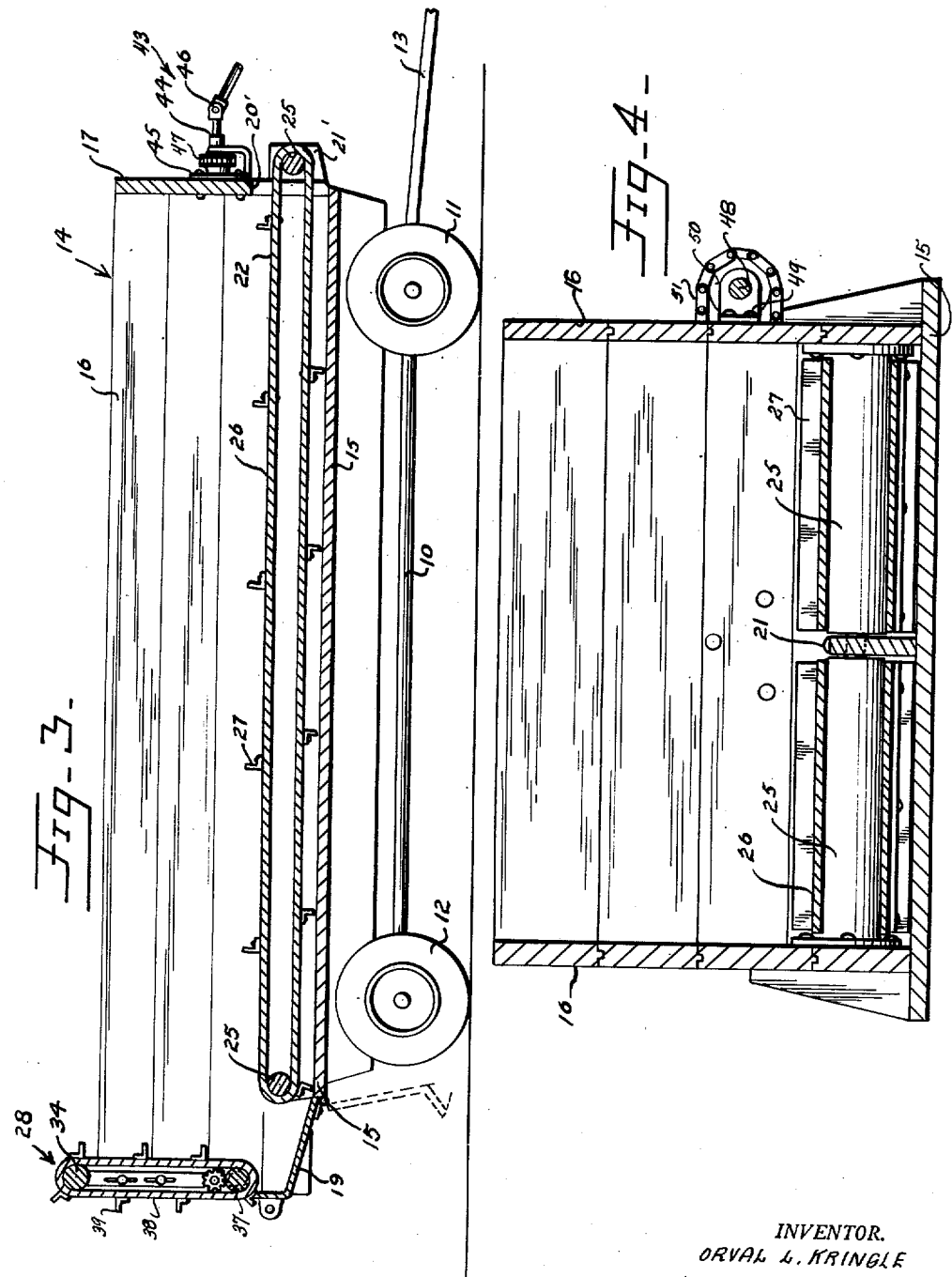
INVENTOR.
ORVAL L. KRINGLE Patented June 24, 1952

2,601,618

UNITED STATES PATENT OFFICE 2,601,618

UNLOADING ASSEMBLY FOR WAGON BOXES

Orval L. Kringle, Rice Lake, Wis.

Application November 5, 1948, Serial No. 58,390

4 Claims. (Cl. 214—83.14)

Broadly, the present invention relates to material handling, and more specifically is directed to an assemblage for unloading and feeding material from a wagon or the like. In more particularity, my invention relates to a conveying and feeding means incorporated in a vehicle or other storage unit for moving and feeding chopped hay and silage from the vehicle into a blower, elevator or other material moving means for its ultimate storage in a barn or silo.

Heretofore, the unloading of this type of material has been more or less a manual process, in that men positioned at either the side or the rear of the vehicle have unloaded the vehicle with forks and similar tools. This process, by virtue of the manual labor involved, is quite expensive and, in addition, time consuming. Various mechanical means have been proposed and employed for unloading the vehicle. In general, this included some sort of conveying means mounted in the vehicle and moving from the front to the rear of the wagon. However, even though the wagon equipped with some sort of driven conveying means for moving the material for unloading it from the vehicle possesses advantages over the manual process, they are still not entirely satisfactory, since men must be employed to insure positively that the material will move and be properly fed from the open end thereof.

Accordingly, an important object of my invention is to provide an endless conveying means for moving the silage toward the open end of the wagon and at the same time assure proper feeding of the silage from the conveyor into the blower or elevator.

Another object of my invention is to provide a pair of endless conveyors mounted above the lower wall of the bottom of the wagon, each of the conveyors being driven from a common source of power.

Another object of my invention is to provide a wagon of the character described with a feeding conveyor which is disposed at the rear end of the vehicle and capable of vertical adjustment, the feeding conveyor cooperating with the moving conveyors to insure that the material will be properly fed into the blower or elevator.

Another object of my invention is to provide an unloading and a feeding mechanism for chopped hay and silage wagons wherein the feeding and unloading mechanisms are driven from a common source of power in such a manner that the feeding mechanism moves at a greater rate of speed than the unloading mechanism.

To accomplish the above and other advantageous objects, the invention broadly includes mounting a pair of spaced endless belts adjacent the bottom of the wagon, each endless belt being of such dimensions that the belts extend substantially from one side wall of the wagon to the opposite side wall. An endless feeding apron is adjustably and detachably mounted at the rear end of the wagon at approximately 90° to the endless belts. A drive connection from a suitable source of power is employed to drive both the endless belts and the endless apron, the arrangement being such that the apron moves at a greater rate of speed than the endless belts.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a view in side elevation of the wheeled wagon having incorporated therewith my inventive concept.

Figure 2 is a top plan view of the wagon shown in Figure 1.

Figure 3 is a vertical sectional view of the wagon taken along the line 3—3 of Figure 2, looking in the direction of the arrows.

Figure 4 is a vertical sectional view taken along the line 4—4 of Figure 2, looking in the direction of the arrows.

Figure 5 is a rear end view of Figure 1, the endless apron being broken away to show more clearly the drive connection.

Figure 6 is a front end view of Figure 1.

Figure 7 is a view taken along the line 7—7 of Figure 2, looking in the direction of the arrows, but being on a somewhat enlarged scale.

I have shown a vehicle of any type having a frame 10 which is provided with front steering wheels 11 and rear wheels 12 and a draw bar 13 of usual construction is operatively connected with the steering wheels 11 whereby the vehicle may be readily moved from place to place. A forage box 14 is adapted to be mounted upon the frame 10 in any suitable manner and has a bottom wall 15, side walls 16, front wall 17, and an open rear end 18. It will be noted that the bottom wall of the box is of such width as to extend over the wheel thereby increasing the capacity of the box. As perhaps best shown in Figure 3, the bottom wall 15 is of lesser length than the side walls 16, and a closure member 19 which is hinged to the bottom wall is adapted to close the area between the bottom wall and the ends of the side walls.

As illustrated in Figures 2 and 4, a support or partition 21 extends longitudinally of the box and is conveniently attached to the bottom wall 15. An opening 20' is formed in the front wall 17 and a horizontally extending strap 21' is provided at the lower end of the front wall of the box adjacent each end thereof. A shaft 22 is disposed laterally of the box and each end of the shaft is rotatably mounted in bearings formed in the straps 21', and the partition is also formed with a bearing surface at the point where the shaft 22 extends therethrough.

A second transversely extending shaft 23 is provided at the rear end of the box and the extremities thereof are rotatably supported in the side walls 16. One end of the shaft 23 extends a substantial distance beyond the side walls 16, and a worm wheel 24 is keyed thereto and the purpose thereof will be hereinafter more fully described. A roller 25 is fixed to the shaft 22 on each side of the partition 21 and, as shown in Figure 4, the roller 25 is of such length as to extend from the partition 21 to the opposite end wall 16. A similar roller assembly is provided for the transversely extending shaft 23. An endless flexible belt or apron 26 is trained around the rollers 25 on the shafts 22 and 23, and hence it can be seen that I thus provide two endless conveyors which are substantially the full width of the box and which are adapted to move in a horizontal direction from the front or end wall 17 toward the open rear end 18, as will later be more fully discussed. If desirable, cleats or the like 27 may be attached to the apron 26 in spaced apart relationship.

A vertically disposed conveying device 28 is attached to the open end 18 of the box 14 at a position above the hinged closure 19. The device comprises a pair of spaced uprights 29 which are adapted to be bolted or otherwise secured to the side walls 16 of the box 14. Each upright 29 is formed with spaced elongated slots 30 which may be alined with bolt openings (not shown) in the side walls 16. Manifestly, by extending bolt 31 through the desired bolt openings and the slots 30 and by drawing up nut 32 thereon, the uprights may be securely fastened to the side walls at the desired height. Obviously, the vertical position of the conveying device 28 relative to the rear end of the aprons 26 may be varied through the medium of the slots 30 and the device may be readily fixed to or removed from the box 14 by manipulation of the bolts and nuts 31 and 32, respectively.

Referring to Figures 3 and 5, it can be seen that a shaft 33 having a roller 34 thereon is rotatably mounted in straps 35 carried by the uprights 29. A second shaft 36 also supporting a roll 37 is journalled at each end adjacent the lower end of the straps 35. An endless apron 38 having spaced transversely extending cleats 39 extends through the rollers 34 and 37. The uprights 29 may be connected at their lower ends with a cross member 40 provided with spaced ears 41 to which complemental ears 42 secured to the closure 19 may be attached when it is desired to maintain the closure in its upper position, as shown in the full lines in Figure 3, as would be the case when the wagon is being used for transporting the silage from the field to the silo.

In order to impart movement to the aprons 26 and 38, I employ a drive mechanism indicated generally 43. As shown in Figures 2 and 3, a driven shaft 44 is journalled in a journal box 45 suitably supported by the front wall 17 intermediate the ends thereof at a point above the opening 20'. The outer end of the shaft 44 is coupled, as shown at 46, to any suitable source of power. A sprocket 47 is keyed to the shaft 44. A drive shaft 48 extends longitudinally of one side of the side walls 16 of the box 14 and is rotatably mounted in spaced bearings 49 attached to the side walls 16. The front end of the shaft 48 supports a sprocket 50 and a drive chain 51 is trained around the sprockets 47 and 50 so that rotary movement may be imparted to the shaft 48. The opposite or rear end of the shaft 48 is provided with a worm gear 52 which meshes with the worm wheel 24 provided on the transversely extending shaft 23. By reference to Figure 1, it will be observed that the outer end of the shaft 23 also has keyed thereto a sprocket 53, and a smaller sprocket 54 is journalled in the upright on a shaft 55. A drive chain 56 extends around the sprockets 53 and 54 in order to rotate the shaft 55. A gear 57 is keyed to the inner end of the shaft 55 and is in mesh with gear 58 provided on the lower or drive roller 37 of the conveying device 28. In order to take up slack on the chain 56 upon lowering of the conveying device 28, an arm 59 is pivoted to the upright 29, as shown at 60. The arm 59 carries a roller 61 which engages the inner surface of the chain 56 and a helical spring 62 operatively connected to the free end of the arm 59 functions to maintain the roller against the chain, as clearly shown in Figure 7. Consequently, when the device 28 is lowered, the arm 59 will automatically take up the slack in the chain.

While the operation of my invention is thought readily apparent, in brief it is as follows. When the box 14 is loaded with chopped hay, straw, silage or similar material in the field, the vehicle is moved by a tractor or other power vehicle to the silo or barn to a position where the rear end of the vehicle is located above a blower 63 or other material moving mechanism. The closure 19 is then disconnected from the elevating device 28 and permitted to fall downwardly about its hinge 20 into the blower 63 where it will serve as a guide for the material being fed from the box 14. When the power source is activated, the shaft 48 will be rotated by the drive chain 51 and the shaft will likewise turn the worm gear 52, thus rotating worm wheel 24 which causes the aprons 26 to move rearwardly, thereby carrying the silage toward the rear of the box. Simultaneously the roller 37 will rotate by virtue of the chain 56 which is trained around the sprockets 52 and 54, thereby moving the apron 38 upwardly and downwardly at a greater speed than that of the aprons 26, whereby the material will be fed evenly into the blower and the closure 19 will guide the material into the blower and prevent any spilling onto the ground. Hence, it can be seen that by virtue of the aprons 26 and 38 it is not necessary to employ any manual labor to deliver the material properly into the blower.

After the vehicle has been unloaded, the source of power is disconnected from the drive shaft 44, the closure 19 moved to its closed position, and the wagon is now ready for transportation to the field for re-loading purposes.

By virtue of the vertically disposed apron at the rear of the wagon, it is possible to rake and guide the material being unloaded in a very simple manner and thereby prevent the necessity of having these steps accomplished by manual labor. Additionally, as this unit is moving at a greater rate of speed than the horizontally moving aprons, the material being unloaded is pushed down and into the blower steadily so that efficient operation of the blower is possible. Also, the conveyor may be readily detached from the wagon box in the event it is desired to have the complete rear end of the box open for any particular transporting problems which may arise. Additionally, this mounting feature will enable the apron to be mounted on other types of boxes wherein other conveying means are employed to move the material rearwardly.

It will be observed in Figure 4 that the height of the partition or support 21 is such that it does not project above the horizontally movable aprons whereby the aprons provide in effect a floor extending between the side walls of the box.

It is, of course, readily apparent that the mechanism for driving the horizontally movable aprons may be accomplished in other ways, such as by sprockets and chains, and a similar arrangement may be employed to impart movement to the vertically movable apron. The essential feature of the drive is that a common source of power is employed for driving the respective aprons. Also, it is possible for the frame of the vertically movable apron to be hingedly supported at the top of the box so that it may be moved inwardly when the machine is not being used for unloading purposes.

The invention is not to be confined to any strict conformity with the showing in the drawings, but may be changed or modified so long as such changes or modifications mark no material departure from the salient features of the invention as expressed in the appended claims.

I claim:

1. In an assembly for unloading chopped hay, silage and similar materials from wagon boxes of the type having an open end, a partition extending longitudinally of the box, an endless conveyor mounted for horizontal movement toward the open end on each side of the partition, a vertically disposed endless apron detachably connected to the box at the open end thereof in spaced relation to the horizontally moving conveyors, means to adjust the vertical position of the apron relative to the horizontally moving conveyors, a source of power, a drive connection between the source of power and the horizontally moving conveyors, and a second drive connection between the first named drive connection and the apron whereby the horizontally moving conveyors and the apron are driven simultaneously.

2. An unloading assembly as claimed in claim 1 wherein the second named drive connection is such that the vertically disposed apron moves at a greater rate of speed than the horizontally moving conveyors.

3. In an assembly for unloading chopped hay, silage and similar materials from a wagon box of the type having an open end, a conveyor mounted in the box for moving the material toward the open end, a downwardly movable apron detachably connected to the box at the open end thereof at approximately right angles to the conveyor, complemental means on said apron and box whereby the vertical position of the apron relative to the conveyor may be adjusted, a source of power, and a drive connection between the source of power and the conveyor and apron whereby movement is imparted to the conveyor and apron.

4. In an assembly for unloading chopped hay, silage and similar material from wagon boxes of the type having an open end, a partition extending longitudinally of the box, an endless conveyor mounted for horizontal movement toward the open end of the box on each side of the partition, a vertically disposed endless apron detachably connected to the box at the open end thereof in spaced relation to the horizontally moving conveyors, complemental means on said apron and box whereby the vertical position of the apron relative to the conveyors may be adjusted, a closure hingedly connected to the box at the open end thereof for closing the area between the endless conveyors and the apron, a source of power, a drive connection between the source of power and the horizontally moving conveyors, and a second drive connection between said first named drive connection and said apron whereby the horizontally moving conveyors and the apron are driven simultaneously, said second named drive connection being such that the vertically disposed apron moves at a greater rate of speed than the horizontally moving conveyors.

ORVAL L. KRINGLE.

REFERENCES CITED

The following references are of record in the file of this patent:

UNITED STATES PATENTS

| Number | Name | Date |
|---|---|---|
| 908,207 | Crane | Dec. 29, 1908 |
| 956,792 | Beskow et al. | May 3, 1910 |
| 1,415,034 | Hoelscher | May 9, 1922 |
| 1,526,704 | Hird | Feb. 17, 1925 |
| 1,780,299 | Jackson | Nov. 4, 1930 |
| 2,431,000 | Step | Nov. 18, 1947 |
| 2,434,718 | Recker | Jan. 20, 1948 |
| 2,463,643 | Recker | Mar. 8, 1949 |
| 2,555,558 | Peterson | June 5, 1951 |

FOREIGN PATENTS

| Number | Country | Date |
|---|---|---|
| 713,053 | France | Aug. 10, 1931 |